United States Patent
Byoun et al.

(10) Patent No.: US 11,749,303 B2
(45) Date of Patent: Sep. 5, 2023

(54) DATA STORAGE DEVICE WITH SOFT ON-DISK ACTIVATION OF FINE ACTUATORS

(71) Applicant: Western Digital Technologies, Inc., San Jose, CA (US)

(72) Inventors: Jaesoo Byoun, Irvine, CA (US); Brian Johnson, Laguna Hills, CA (US); Gaku Ikedo, Fujisawa (JP); Hideaki Ito, Fujisawa (JP); Naoyuki Kagami, Fuisawa (JP)

(73) Assignee: Western Digital Technologies, Inc., San Jose, CA (US)

( * ) Notice: Subject to any disclaimer, the term of this patent is extended or adjusted under 35 U.S.C. 154(b) by 7 days.

(21) Appl. No.: 17/550,991

(22) Filed: Dec. 14, 2021

(65) Prior Publication Data
US 2023/0186947 A1    Jun. 15, 2023

(51) Int. Cl.
*G11B 5/55* (2006.01)
*G11B 21/10* (2006.01)
*G11B 5/48* (2006.01)
*G11B 5/60* (2006.01)

(52) U.S. Cl.
CPC .............. *G11B 5/556* (2013.01); *G11B 5/483* (2015.09); *G11B 5/4873* (2013.01); *G11B 5/5526* (2013.01); *G11B 21/106* (2013.01); *G11B 5/6017* (2013.01)

(58) Field of Classification Search
None
See application file for complete search history.

(56) References Cited

U.S. PATENT DOCUMENTS

| | | |
|---|---|---|
| 5,828,522 A | 10/1998 | Brown et al. |
| 6,025,968 A | 2/2000 | Albrecht |
| 6,115,201 A | 9/2000 | Enarson et al. |
| 6,541,931 B2 | 4/2003 | Ho et al. |
| 7,566,985 B2 | 7/2009 | Miyagoe |
| 7,911,462 B2 | 3/2011 | Lin |
| 8,145,934 B1 | 3/2012 | Ferris et al. |
| 8,902,539 B1 * | 12/2014 | Liu et al. ............. G11B 5/5547 369/30.17 |
| 9,142,225 B1 | 9/2015 | Chen et al. |
| 9,245,577 B1 | 1/2016 | Byoun |
| 9,390,749 B2 | 7/2016 | Ferris et al. |

(Continued)

OTHER PUBLICATIONS

Sasaki et al., "Active Vibration Control of a Microactuator for the Hard Disk Drive Using Self-Sensing Actuation", Smart Materials Research, vol. 2012, Article ID 920747, 2012, 7 pages.

*Primary Examiner* — Craig A. Renner
(74) *Attorney, Agent, or Firm* — Neugeboren O'Dowd PC (57) ABSTRACT

Various illustrative aspects are directed to a data storage device comprising one or more disks; an actuator arm assembly comprising one or more actuator arms, and configured to position the one or more actuator arms over disk surfaces of the one or more disks; one or more fine actuators, disposed on the one or more actuator arms; and one or more processing devices. The one or more processing devices are configured to: output a driver current to the one or more fine actuators, wherein the one or more processing devices are configured to rate limit a rise of the driver current over time during an activation of the driver current to within a selected rate limit of current rise over time.

20 Claims, 6 Drawing Sheets

(56) References Cited

U.S. PATENT DOCUMENTS

| | | |
|---|---|---|
| 9,396,751 B1 | 7/2016 | Byoun et al. |
| 9,437,231 B1 | 9/2016 | Ferris et al. |
| 9,564,162 B1 | 2/2017 | Byoun et al. |
| 9,620,160 B1 | 4/2017 | Byoun et al. |
| 9,666,224 B1 | 5/2017 | Byoun |
| 9,972,348 B1 | 5/2018 | Ferris et al. |
| 10,013,032 B1 | 7/2018 | Ferris et al. |
| 10,109,308 B1 | 10/2018 | Johnson et al. |
| 10,176,835 B1 | 1/2019 | Byoun et al. |
| 10,176,840 B1 | 1/2019 | Johnson et al. |
| 10,242,698 B1 | 3/2019 | Byoun et al. |
| 10,242,706 B1 | 3/2019 | Johnson et al. |
| 10,381,030 B1 | 8/2019 | Liu |
| 10,504,553 B1 | 12/2019 | Byoun |
| 10,714,133 B1 | 7/2020 | Johnson et al. |
| 10,839,839 B1 * | 11/2020 | Uchida et al. ....... G11B 5/5547 |
| 11,081,988 B1 | 8/2021 | Byoun |
| 2004/0104759 A1 | 6/2004 | Nakamori et al. |
| 2011/0089920 A1 | 4/2011 | Leong et al. |

\* cited by examiner

DATA STORAGE DEVICE WITH SOFT ON-DISK ACTIVATION OF FINE ACTUATORS

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo wedges or servo sectors. The servo sectors comprise head positioning information (e.g., a track address) which is read by the head and processed by a servo control system to control the actuator arm as it seeks from track to track.

Figure 1:
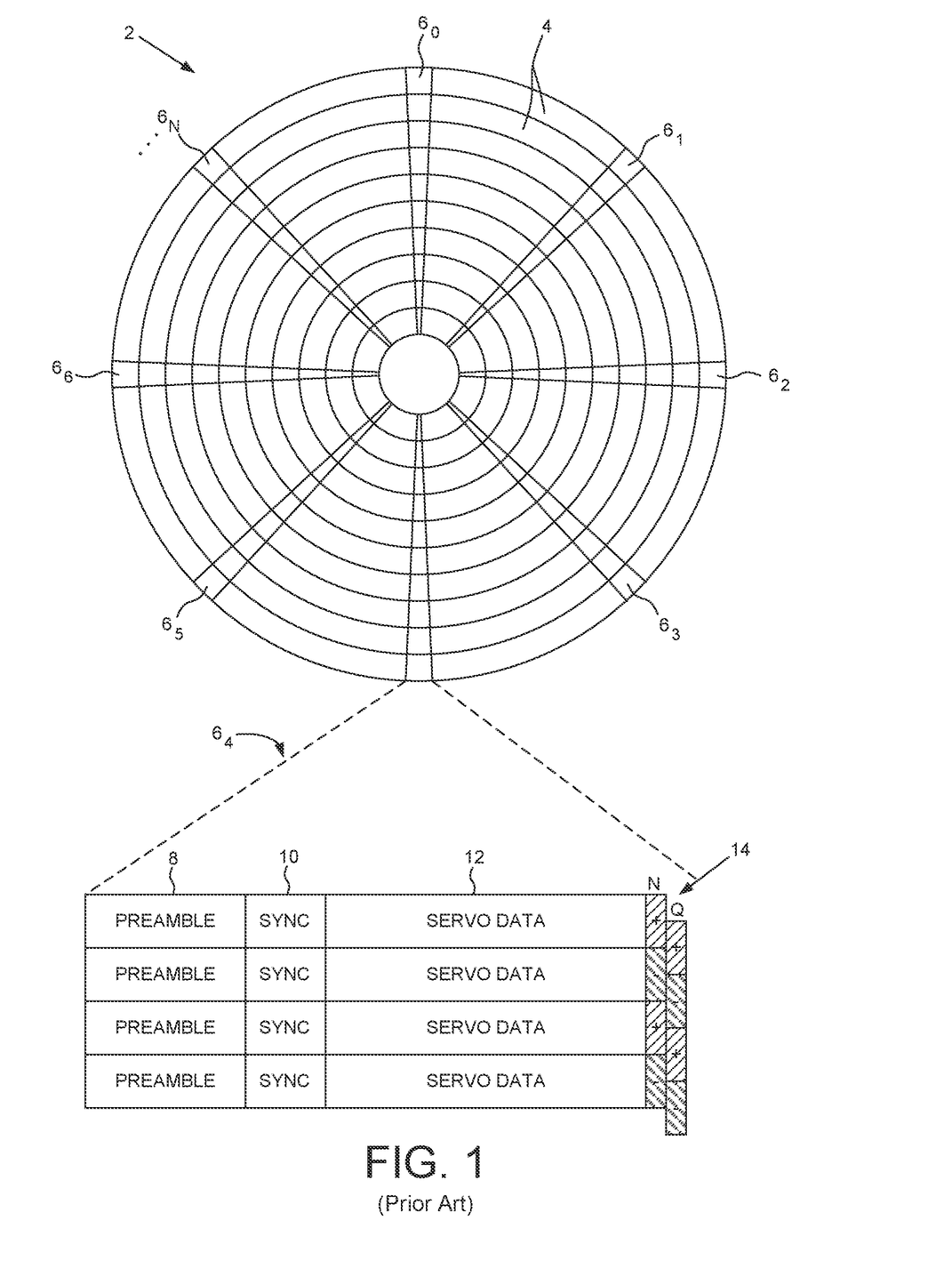
FIG. 1 shows a prior art disk format as comprising a number of radially-spaced, concentric servo tracks defined by servo wedges recorded around the circumference of each servo track.

FIG. 1 shows a prior art disk format 2 as comprising a number of radially-spaced, concentric servo tracks 4 defined by servo wedges $6_0$-$6_N$ recorded around the circumference of each servo track. A plurality of concentric data tracks are defined relative to the servo tracks 4, wherein the data tracks may have the same or a different radial density (e.g., tracks per inch (TPI)) than the servo tracks 6. Each servo wedge $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo wedge (e.g., servo wedge 64) further comprises groups of phase-based servo bursts 14 (e.g., N and Q servo bursts), which are recorded with a predetermined phase relative to one another and relative to the servo track centerlines.

The coarse head position information is processed to position a head over a target data track during a seek operation, and the servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to one or more head actuators in order to actuate the head radially over the disk in a direction that reduces the PES. The one or more head actuators may comprise a voice coil motor, as well as potentially other actuators.

SUMMARY

Various examples disclosed herein provide data storage devices such as hard disk drives with multi-stage actuators with soft on-disk engagement, among other aspects. Prior art multi-actuator disk drives typically require milliactuators and/or microactuators to be engaged only while their actuator arms and the read/write heads suspended by them are parked on their ramps, and not while the arms and heads were suspended over the disks. This is because, in prior art multi-actuator disk drives, activation of the drivers to engage the milliactuators and/or microactuators typically would be disruptive and potentially catastrophically destructive if done while the heads were positioned over the disks. In prior art disk drives, activation of the drivers to engage the milliactuators and/or microactuators typically causes a sudden introduction of bias current that, if done while the heads were suspended over the disks, would typically overshoot safe constraints or limits on driving the actuators and on safe slew rate constraints or limits, and may cause excessive transient slew rates, vertical bouncing (i.e., z-bouncing), and physical head-disk interactions, which would be potentially catastrophically destructive to the disk drive. Activation of the drivers while the actuator arms are parked on their corresponding ramps, away from the disk surfaces, is thus the only safe option, in typical prior art multi-actuator disk drives.

On the other hand, novel multi-stage actuators with soft on-disk engagement of this disclosure may enable milliactuators and/or microactuators to be safely and reliably engaged while the actuator arms and their read/write heads are suspended over their corresponding disks, among other advantages. Activating the milliactuators and/or microactuators while they are suspended over the disks, rather than requiring them to be activated only when parked on their ramps, enables faster disk drive operating speeds, and enables faster data read and write operations, among other advantages, in accordance with various aspects of the present disclosure.

The present disclosure includes the inventive insight that the unsafe behavior of milliactuators and/or microactuators if activated while their actuator arms are suspended over their disks, in prior art multi-actuator disk drives, is due to the sudden jump in bias current delivered to the milliactuators and/or microactuators by their prior art driver circuits; and that these disadvantages may be overcome by moderating the increase in bias current delivered to the milliactuators and/or microactuators when first activating, as in various examples as described in the present disclosure. Such moderation of the activation bias current delivered to the milliactuators and/or microactuators when first activating may be accomplished, in various examples of the present disclosure, by making any of various modifications to one or more fine actuator driver circuits that activate and drive the milliactuators and/or microactuators, as explained further below with reference to various examples described herein. Such fine actuator driver circuits may be configured with internal bias current circuitry to generate initial bias current more moderately or slowly than in prior art drivers, to ensure that the drivers activate without overshooting, or with any overshoot constrained to be small enough to remain within assured safety margins, to ensure that the fine actuators may be safely engaged and disengaged while on disk. Such fine actuator driver circuits may further be configured with internal bias current circuitry to generate the initial bias current very quickly, within such safety constraints, such that the speed of activation may be optimized to be as fast as possible within a specified safety margin, or within a reasonable margin thereof, and with an activation time that may be much less, and may be orders of magnitude less, than the time required to mechanically actuate the actuator arm assembly from the ramps to the disk surfaces, in various examples.

Various implementations of the present disclosure may thus provide disk drives with faster overall data response times, at least by enabling milliactuators and/or microactuators to be activated while on disk instead of only while parked on their ramps, thus providing faster initial startup times of milliactuators and/or microactuators. Various implementations of the present disclosure may provide further advantageous features.

One such set of further advantageous features comprises novel power saving modes, such as by enabling the freedom and flexibility to disengage the milliactuators and/or microactuators on disk before performing a primary seek operation performed by a primary actuator, and then re-engage the milliactuators and/or microactuators once the primary seek operation is finished, rather than needing to keep the milliactuators and/or microactuators always engaged and always drawing power during seek operations, even though they aren't needed and aren't performing any needed function during the seek operation, because either disengaging them or re-engaging them while performing a seek operation on disk would violate safety requirements. Such novel power saving modes of implementations of the present disclosure may also comprise enabling the freedom and flexibility to disengage and re-engage the milliactuators and/or microactuators while the heads are on disk during lulls in demand for write and/or read operations, rather than needing to retract the actuator arms to park on the ramps to disengage and to re-engage the milliactuators and/or microactuators during such lulls.

Another such set of further advantageous features of implementations of the present disclosure comprises the freedom and flexibility to disable and re-enable fine actuator drivers during debugging tasks or processes for the drivers, while the actuator arms are still on disk, instead of needing to park the actuator arms on their ramps before re-engaging the milliactuators and/or microactuators during driver debugging modes. These and a variety of further advantages are elucidated in the detailed description below and the accompanying figures.

Various illustrative aspects are directed to a data storage device comprising one or more disks; an actuator arm assembly comprising one or more actuator arms, and configured to position the one or more actuator arms over disk surfaces of the one or more disks; one or more fine actuators, disposed on the one or more actuator arms; and one or more processing devices. The one or more processing devices are configured to: output a driver current to the one or more fine actuators; and rate limit a rise of the driver current over time during an activation of the driver current to within a selected rate limit of current rise over time.

Various illustrative aspects are directed to a method comprising: outputting, by one or more processing devices, a driver current to the one or more fine actuators; and rate limiting, by the one or more processing devices, a rise of the driver current over time during an activation of the driver current to within a selected rate limit of current rise over time.

Various illustrative aspects are directed to one or more processing devices comprising: means for outputting a driver current to the one or more fine actuators; and means for rate limiting a rise of the driver current over time during an activation of the driver current to within a selected rate limit of current rise over time.

Various further aspects are depicted in the accompanying figures and described below, and will be further apparent based thereon.

BRIEF DESCRIPTION OF THE DRAWINGS

Various features and advantages of the technology of the present disclosure will be apparent from the following description of particular examples of those technologies, and as illustrated in the accompanying drawings. The drawings are not necessarily to scale; the emphasis instead is placed on illustrating the principles of the technological concepts. In the drawings, like reference characters may refer to the same parts throughout the different views. The drawings depict only illustrative examples of the present disclosure, and are not limiting in scope.

DETAILED DESCRIPTION

Figure 2A:
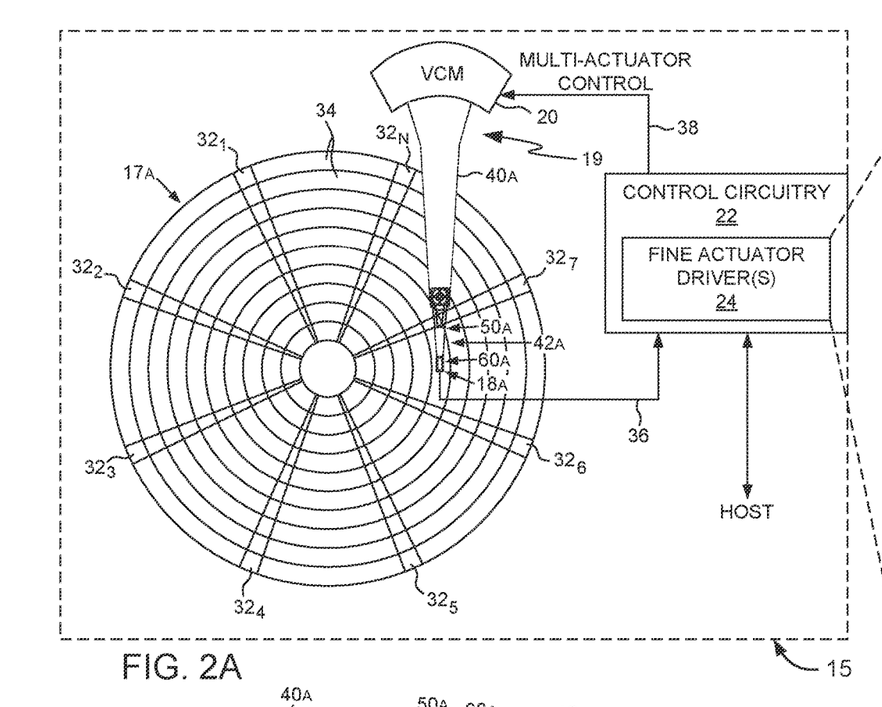
FIGS. 2A and 2B illustrate conceptual block diagrams of a top view and a side view of a data storage device in the form of a disk drive, in accordance with aspects of the present disclosure.
Figure 2B:
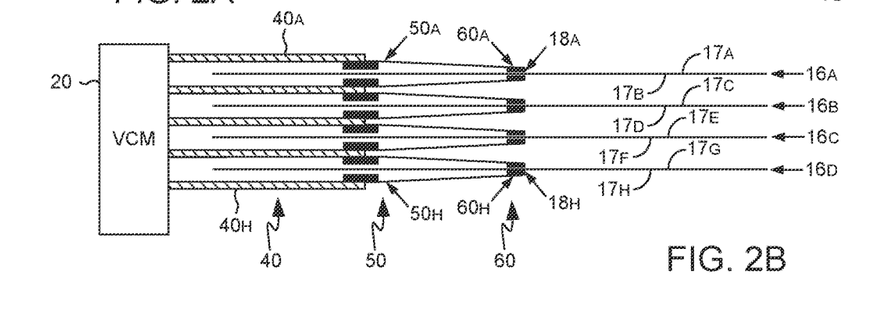
Figure 2C:
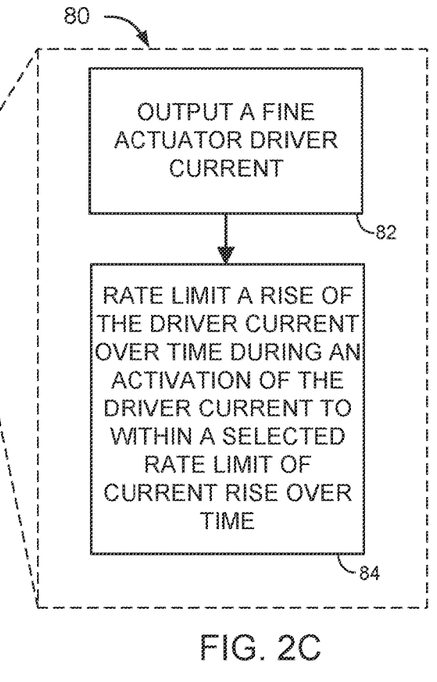
FIG. 2C depicts a flowchart for an example method that one or more fine actuator drivers of control circuitry of a disk drive may perform or execute in controlling the operations of the disk drive, including the operations of an actuator arm assembly, in accordance with aspects of the present disclosure.

FIGS. 2A and 2B illustrate conceptual block diagrams of a top view and a side view of a data storage device in the form of a disk drive 15, in accordance with aspects of the present disclosure. Disk drive 15 comprises control circuitry 22, an actuator arm assembly 19, and a plurality of hard disks 16A, 16B, 16C, 16D ("hard disks 16"). FIG. 2C depicts a flowchart for an example method 80 that one or more fine actuator drivers 24 of control circuitry 22 of disk drive 15 may perform or execute in controlling the operations of disk drive 15, including the operations of actuator arm assembly 19, in accordance with aspects of the present disclosure. Actuator arm assembly 19 comprises a primary actuator 20 (e.g., a voice coil motor ("VCM")) and a number of actuator arms 40 (e.g., topmost actuator arm 40A, as seen in the perspective view of FIGS. 2A and 2B). Each of actuator arms 40 comprises a suspension assembly 42 at a distal end thereof (e.g., example topmost suspension assembly 42A comprised in topmost actuator arm 40A, in the view of FIGS. 2A and 2B). Each suspension assembly 42 comprises one or more auxiliary actuators or fine actuators, such as milliactuators 50 and microactuators 60 (e.g., milliactuator 50A and microactuator 60A comprised in topmost suspension assembly 42A of topmost actuator arm 40A, in the view of FIGS. 2A and 2B; milliactuator 50H and microactuator 60H comprised in lowest suspension assembly 42H of lowest actuator arm 40H, in the view of FIG. 2B). Milliactuators 50 may also be referred to as milli-dual stage actuators or milli-DSAs, or milli-triple stage actuators or milli-TSAs, and microactuators 60 may also be referred to as head micro actuators, or HMAs.

Each of actuator arms 40 is configured to suspend a read/write head 18 in close proximity over a corresponding disk surface 17 (e.g., read/write head 18A suspended by topmost actuator arm 40A over topmost corresponding disk surface 17A, read/write head 18H suspended by lowest actuator arm 40H over lowest corresponding disk surface 17H). Other examples may include any of a wide variety of other numbers of hard disks and disk surfaces, other numbers of actuator arm assemblies and primary actuators besides the one actuator arm assembly 19 and the one primary actuator 20 in the example of FIGS. 2A and 2B, and other numbers of milliactuators, microactuators, and/or other fine actuators on each actuator arm, for example.

In various examples, disk drive 15 may be considered to perform or execute functions, tasks, processes, methods, and/or techniques, including aspects of example method 80, in terms of its control circuitry 22 performing or executing such functions, tasks, processes, methods, and/or techniques. Control circuitry 22 may take the form of one or more processing devices, and may implement or perform functions, tasks, processes, methods, or techniques by executing computer-readable instructions of software code or firmware code, on hardware structure configured for executing such software code or firmware code, in various examples. Control circuitry 22 may also implement or perform functions, tasks, processes, methods, or techniques by its hardware circuitry implementing or performing such functions, tasks, processes, methods, or techniques by the hardware structure in itself, without any operation of software, in various examples.

Control circuitry 22 may comprise one or more processing devices that constitute device drivers, specially configured for driving and operating certain devices. Such device drivers may comprise one or more fine actuator drivers 24, configured for driving and operating fine actuators, such as milliactuators 50 and microactuators 60. One or more fine actuator drivers 24 may be referred to hereafter as fine actuator driver 24, with the understanding that this may refer to any of one or more fine actuator drivers for driving one or more milliactuators 50 and/or one or more microactuators 60. The fine actuators 50, 60 may be implemented using piezoelectric elements, and fine actuator drivers 24 may be configured for driving the fine actuators 50, 60 by delivering a driving current to the piezoelectric elements to cause them to actuate, in various examples. Fine actuator drivers 24 may be configured as integrated components of one or more power large-scale integrated circuit (PLSI) chips or circuits, as part of control circuitry 22, in various examples. Fine actuator drivers 24 may also be configured as components in other large-scale integrated circuits such as system on chip (SoC) circuits, or as more or less stand-alone circuits, operably coupled to other components of control circuitry 22, in various examples.

Primary actuator 20 may perform primary, macroscopic actuation of a plurality of actuator arms 40, each of which suspends one or more read/write heads, e.g., head 18A, over and proximate to corresponding disk surfaces of disks 16. (The position of the read/write head 18A is indicated in FIG. 2A, although the heads are generally positioned very close to the disk surfaces, and are far too small to be visible if depicted to scale in FIGS. 2A and 2B.) Primary actuator 20, as a large-scale actuator, may thus be differentiated from auxiliary or fine actuators positioned on the actuator arms 40, such as milliactuators 50 and/or microactuators 60. Milliactuators 50 and microactuators 60 may collectively be referred to as fine actuators, fine-scale actuators, or auxiliary actuators, for purposes of this disclosure.

Disk drive 15 depicted in the illustrative example of FIGS. 2A and 2B is a triple-stage actuator disk drive, comprising a triple-stage actuator design, which comprises primary actuator 20 on which the actuator arms are suspended, and a milliactuator 50 and a microactuator 60 on each actuator arm 40. Other examples of this disclosure may take the form of dual-stage actuator disk drives, which may include a primary actuator on which the actuator arms are suspended, and one auxiliary actuator on each actuator arm. This single auxiliary actuator in a dual-stage actuator design may be implemented as either a milliactuator or a microactuator as described herein, or in the form of any other type of actuator capable of actuating the heads.

Example disk drive 15 of FIGS. 2A and 2B comprises four hard disks 16. Other examples may comprise any number of disks, such as just one disk, two disks, three disks, or five, ten, twenty, or more disks. Hard disks 16 may also be known as platters, and their disk surfaces may also be referred to as media, or media surfaces. The four hard disks 16 comprise eight disk surfaces 17A, 17B, 17C, 17D, 17E, 17F, 17G, and 17H ("disk surfaces 17"), with one disk surface 17 on each side of each hard disk 16, in this illustrative example. Actuator assembly 19 suspends the heads 18 of each actuator arm 40 over and proximate to a corresponding disk surface 17, enabling each head 18 to write control features and data to, and read control features and data from, its respective, proximate disk surface 17. In this sense, head 18 of each actuator arm 40 interacts with a corresponding disk surface 17. The heads 18 write to and read from their corresponding disk surfaces 17 under the positioning control of the actuators of actuator arm assembly 19, comprising primary actuator 20, milliactuators 50, and microactuators 60, in this example, which are controlled by control circuitry 22, including by fine actuator drivers 24, in the case of milliactuators 50 and microactuators 60.

The term "disk drive surface" may be understood to have the ordinary meaning it has to persons skilled in the applicable engineering fields of art. The term "disk drive surface" may be understood to comprise both the very outer surface layer of a disk drive as well as a significant volume of disk matter beneath the outer surface layer, which may be considered in terms of atomic depth, or (in a greatly simplified model) the number of atoms deep from the surface layer of atoms in which the matter is susceptible of physically interacting with the heads. The term "disk drive surface" may comprise the portion of matter of the disk that is susceptible of interacting with a read/write head in disk drive operations, such as control write operations, control read operations, data write operations, and data read operations, for example.

In the embodiment of FIGS. 2A and 2B, each disk surface, e.g., disk surface 17A as shown in FIG. 2A, comprises a plurality of control features. The control features comprise servo wedges $32_1$-$32_N$, which define a plurality of servo tracks 34, wherein data tracks are defined relative to the servo tracks 34, and which may be at the same or different radial density. Control circuitry 22 processes a read signal 36 emanating from the respective head, e.g., head 18A, to read from disk surface 17A, to demodulate the servo wedges $32_1$-$32_N$ and generate a position error signal (PES) representing an error between the actual position of the head and a target position relative to a target track. A servo control system in the control circuitry 22 filters the PES from the servo wedges using a suitable compensation filter to generate a control signal 38 applied to actuator arm assembly 19, including to control actuator 20, which functions as a primary actuator, and which rotates actuator arm assembly 19 about an axial pivot in order to perform primary actuation of the corresponding heads radially over the disk surfaces 17 in a direction that reduces the PES, as well as to control fine actuators 50 and 60, as further described below The heads may also be servoed using one or more fine actuators, such as milliactuators 50 and microactuators 60. Milliactuators 50 and microactuators 60 may both be implemented as piezoelectric actuators, in some examples. In particular, in some examples, milliactuators 50 and microactuators 60 may be implemented with a piezoelectric material such as lead zirconium titanate (or $PbZrTiO_3$ (in a variety of specific atomic numbers, the relations of which are omitted in this simplified notation), a.k.a. "PZT," sometimes used synonymously with "piezoelectric" in the art), or another ceramic perovskite material or another substantially piezoelectric material. The use of piezoelectric materials for milliactuators 50 and microactuators 60 is further discussed below with reference to the subsequent figures.

Generally, milliactuators 50 may be configured to actuate a suspension assembly relative to the actuator arm, while microactuators 60 may be configured to actuate the slider (and thus the head) relative to the suspension assembly (as further described below). Other examples may comprise other numbers, arrangements, or levels of precision of fine actuators. The servo wedges $32_1$-$32_N$ may comprise any suitable head position information, such as a track address for coarse positioning and servo bursts for fine positioning, as illustrative examples. The servo bursts may comprise any suitable pattern, such as an amplitude-based servo pattern and/or a phase-based servo pattern, including as described above with reference to FIG. 1.

In the example of FIGS. 2A and 2B, actuator arm assembly 19 rotates actuator arms 40 about a common pivot. In another example, a first actuator arm assembly and/or VCM and a second actuator arm assembly and/or VCM, or other types of primary actuators, may each be configured to actuate respective actuator arm assemblies or sets of multi-actuator arms about separate pivots, for example, mounted at different circumferential locations about the disks. Other examples may employ more than two actuator arm assemblies or primary actuators or multi-actuators, which may be actuated about a common pivot, or which may be comprised in multiple multi-actuators mounted at different circumferential locations about the disks.

In executing example method 80 of FIG. 2C (aspects of which will also be further explained below with reference to the further figures), control circuitry 22 may issue a plurality of commands to other components of disk drive 15, receive information from other components of disk drive 15, and perform operations, such as generating driver currents for outputting or applying to system components of disk drive 15. In particular, one or more fine actuator drivers 24 of control circuitry 22 may generate and output fine actuator driver currents (82). One or more fine actuator drivers 24 may further rate limit a rise of the driver current over time during an activation of the driver current to within a selected rate limit of current rise over time (84), which may be implemented simultaneously or at overlapping times with generating and outputting the fine actuator driver currents. That is, the rate limiting of the rise of the driver current over time during the activation of the driver current to within a selected rate limit of current rise over time may be implemented at the same time as the initiation of the generating and outputting of the fine actuator driver currents. That is, in various examples, one or more fine actuator drivers 24 may be configured for driving milliactuators 50 and microactuators 60 with moderated currents for initial startup engagement and/or for disengagement of milliactuators 50 and microactuators 60, providing "soft" on-disk engagement, or on-disk activation within safety constraints and nominally free of risk of physically contacting the disk surface, in accordance with principles of this disclosure, in this example.

The selected rate limit of current rise over time may be defined in terms of safe operating constraints of the fine actuators during the activation of the driver current while the actuator arms are positioned over the disk surfaces, as further described below. The selected rate limit of current rise over time may be defined in terms of operating constraints of the one or more fine actuators that may prevent the one or more heads from physically contacting the disk surfaces during the activation of the driver current while the actuator arms are positioned over the disk surfaces, reliably over the projected or nominal lifetime of the disk drive, and at least within nominal operating conditions, as those may be commonly understood in the art, and as further described herein. The one or more fine actuator drivers 24, or driver devices, may further be configured to rate limit the rise of the driver current over time during the activation of the driver current to an optimized rate of current rise over time, determined via a process to optimize for increasing the driver current within a feasible margin of being as quickly as possible within the safe operating constraints of the fine actuators during the activation of the driver current while the actuator arms are positioned over the disk surfaces, as further described below. The one or more fine actuator drivers 24, or driver devices, may further be configured to activate the fine actuator driver current output while the actuator arm assembly 19 has the one or more actuator arms 40 positioned over the one or more disks 17, as further described below. The selected limit of current change over time may be selected to ensure safe operation of the one or more fine actuators 50, 60 while the one or more fine actuators 50, 60 are positioned over the one or more disks 17. The one or more fine actuator drivers 24 may further be configured to rate limit, during a deactivation of the driver current, a fall of the driver current over time to within a selected limit of current fall over time. Fine actuator drivers 24 or driver devices may comprise or be comprised among one or more processing devices of control circuitry 22 in various examples.

Other examples may include only milliactuators 50 or microactuators 60, or other varieties or combinations of fine actuators, and may include one or more fine actuator drivers 24 configured for delivering fine actuator driver currents configured for driving any variety or combination of fine actuators, in accordance with various examples of this disclosure. Engaging a fine actuator driver 24 or a fine actuator 50, 60 may be another way of referring to activating or turning on the fine actuator driver 24 or fine actuator 50, 60, and disengaging a fine actuator driver 24 or a fine actuator 50, 60 may be another way of referring to deactivating or turning off the fine actuator driver 24 or fine actuator 50, 60. A fine actuator 50, 60 may be engaged, activated, or turned on by means of engaging the corresponding fine actuator driver 24, which then generates or outputs an activation current to the fine actuator 50, 60, and a fine actuator 50, 60 may be disengaged, deactivated, or turned off by means of disengaging the corresponding fine actuator driver 24, which then ceases generating or outputting the activation current to the fine actuator 50, 60.

Figures 3A, 3B:
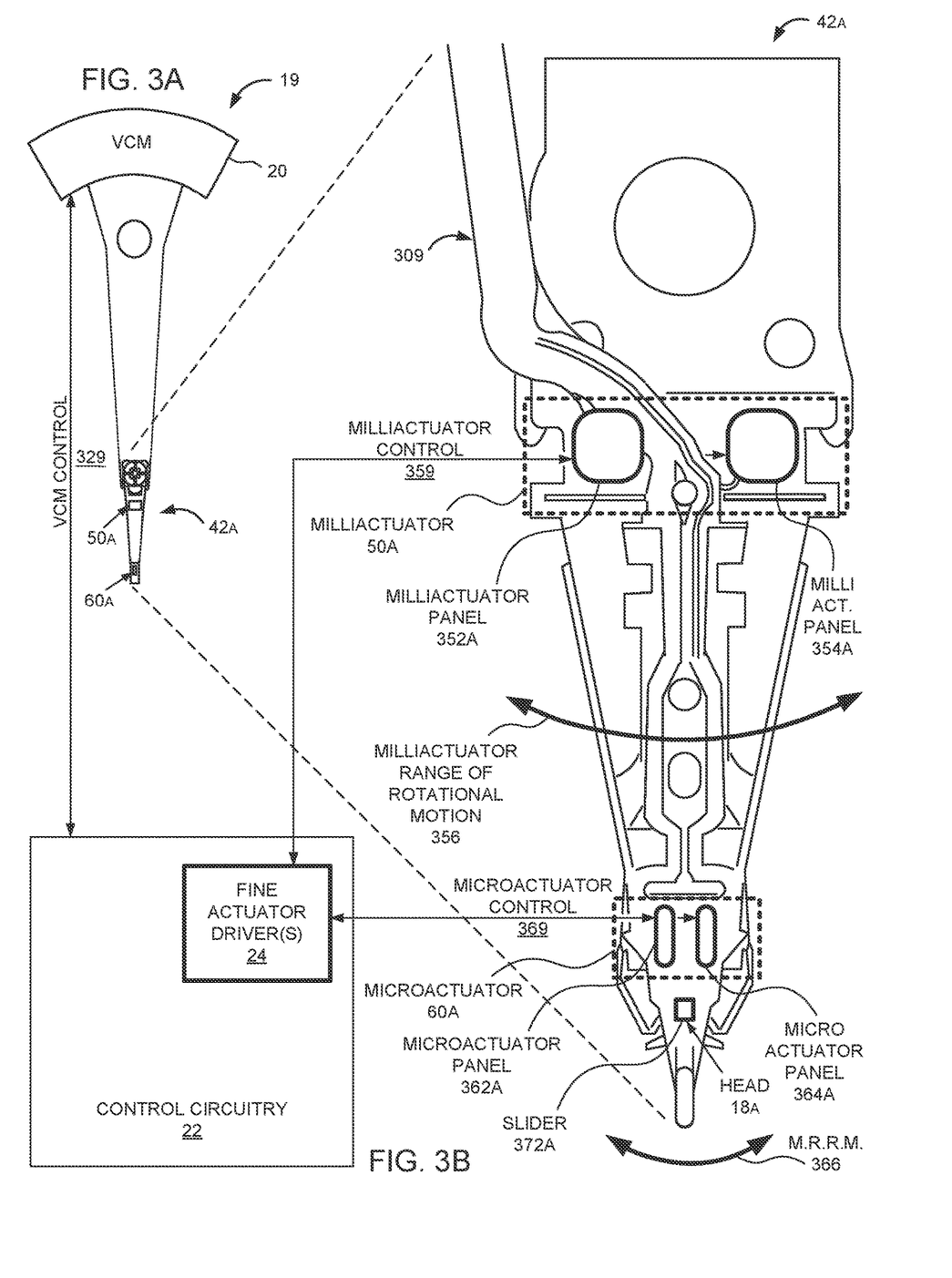
FIG. 3A illustrates a conceptual top view diagram of an actuator arm assembly as shown in FIGS. 2A and 2B, comprising a set of suspension assemblies, exemplified by a topmost suspension assembly in the top view of FIG. 3A, in accordance with aspects of the present disclosure.
FIG. 3B illustrates an expanded, conceptual top view diagram of the example topmost suspension assembly from among the suspension assemblies comprised in an actuator arm assembly, in operative communication with control circuitry comprising one or more fine actuator drivers, in accordance with aspects of the present disclosure.

FIG. 3A illustrates a conceptual top view diagram of actuator arm assembly 19 as shown in FIGS. 2A and 2B, comprising a set of suspension assemblies 42, exemplified by topmost suspension assembly 42A in the top view of FIG. 3A, in accordance with aspects of the present disclosure. FIG. 3B illustrates an expanded, conceptual top view diagram of example topmost suspension assembly 42A from among suspension assemblies 42 comprised in actuator arm assembly 19, in operative communication with control circuitry 22 comprising one or more fine actuator drivers 24, in accordance with aspects of the present disclosure. Actuator arm assembly 19 and suspension assemblies 42 including suspension assembly 42A may be identical with the corresponding example elements shown in FIGS. 2A and 2B; a wide variety of other implementations may also be made and used in accordance with various examples of the present disclosure.

Control circuitry 22 may maintain control communications with primary actuator 20, implemented as a VCM, via conceptually depicted VCM control communication channel 329, which may conduct read signals 36 and control signals 38 (both as shown in FIG. 2A) from primary actuator 20 to control circuitry 22 and from control circuitry 22 to primary actuator 20, respectively. Control circuitry 22 also comprises one or more fine actuator drivers 24, which are configured with conceptually depicted milliactuator control communication channels 359 with milliactuators 50, and conceptually depicted microactuator control communication channels 369 with microactuators 60. Milliactuator control communication channels 359 and microactuator control communication channels 369 may be physically implemented, along with more general control and data read/write communication channels and other electrical signal channels, as part of electrical connection channels 309, which may extend between control circuitry 22 (complete physical connection not depicted in FIG. 3B) and various components of suspension assemblies 42, including milliactuator 50A, microactuator 60A, and slider 372A of example topmost suspension assembly 42A. Example slider 372A may have read/write head 18A suspended thereon (FIG. 3B depicts their position on slider 372A, while head 18A may be too small to be depicted at the scale of FIG. 3B).

Milliactuator 50A comprises two milliactuator panels 352A, 354A in this example. Milliactuator 50A may also comprise additional surrounding components, such as control components for controlling milliactuator panels 352A, 354A, in response to milliactuator control and driver signals received from one or more fine actuator drivers 24. Milliactuator panels 352A, 354A may be implemented as piezoelectric panels, such as PZT panels, as described above. Milliactuator panels 352A, 354A may thus respond to electrical signals by expanding or contracting. For example, fine actuator drivers 24 may transmit one or more currents or signals to milliactuator 50A to expand milliactuator panel 352A and to contract milliactuator panel 354A at the same time, thereby implementing the effect of rotating the portion of suspension assembly 42A distal to milliactuator 50A, including head 18A, counterclockwise along milliactuator range of rotational motion 356. Alternately, fine actuator drivers 24 may transmit one or more currents or signals to milliactuator 50A to expand milliactuator panel 354A and to contract milliactuator panel 352A at the same time, thereby implementing the effect of rotating the portion of suspension assembly 42A distal to milliactuator 50A, including head 18A, clockwise along milliactuator range of rotational motion 356. Fine actuator driver 24 is operably coupled to milliactuator 50A via intervening milliactuator control signal channel 359.

Analogously, microactuator 60A comprises two microactuator panels 362A, 364A in this example. Microactuator 60A may also comprise additional surrounding components, such as control components for controlling microactuator panels 362A, 364A, in response to microactuator control and driver signals received from one or more fine actuator drivers 24. Microactuator panels 362A, 364A may also be implemented as piezoelectric panels, such as PZT panels, as described above. Microactuator panels 362A, 364A may thus also respond to electrical signals by expanding or contracting. For example, fine actuator drivers 24 may also transmit one or more currents or signals to microactuator 60A to expand microactuator panel 362A and to contract milliactuator panel 354A at the same time, thereby implementing the effect of rotating slider 372A, including head 18A, counterclockwise along microactuator range of rotational motion (M.R.R.M) 366; and alternately, fine actuator drivers 24 may transmit one or more currents or signals to microactuator 60A to expand microactuator panel 364A and to contract milliactuator panel 362A at the same time, thereby implementing the effect of rotating slider 372A, including head 18A, clockwise along microactuator range of rotational motion 366. Fine actuator driver 24 is operably coupled to microactuator 60A via intervening microactuator control signal channel 369.

Fine actuator drivers 24 may output driver signals for rotating milliactuators 50 and microactuators 60 in any combination of control signals for either or both of milliactuators 50 and/or microactuators 60 to rotate counterclockwise and/or clockwise in any combination. The control systems for both milliactuators 50 and microactuators 60, as well as for primary actuator 20, and for any other actuators and/or other control elements, may work to coordinate actuation among all three layers of actuators on each actuator arm, or may have any logical relationship, or no logical relationship (but independent position error correction), between them, in different implementations in accordance with this disclosure. Each of the other suspension assemblies 42 etc. (not individually depicted) comprised among suspension assemblies 42 in actuator arm assembly 19 may also comprise analogous milliactuators, analogous microactuators, analogous sliders, and analogous heads (not individually depicted), which may also comprise analogous components and perform analogous functions in response to driver currents or signals from fine actuator drivers 24, as those components and functions described herein with reference to milliactuator 50A, microactuator 60A, slider 372A, and head 18A.

Thus, each respective milliactuator 50 may be disposed at a respective proximal end of a respective suspension assembly 42 disposed on a respective actuator arm of the actuator arms 40, and each respective microactuator 60 may be disposed at a respective distal end of a respective suspension assembly 42 disposed on a respective actuator arm of the actuator arms 40. Each of the actuator arms 40 may comprise both a milliactuator 50 and a microactuator 60. Each respective fine actuator 50, 60 may comprise two opposing actuator panels (e.g., milliactuator panels 352A, 354A, microactuator panels 362A, 364A) disposed on opposing sides of a longitudinal axis of a respective suspension assembly 42 disposed at a distal end of a respective actuator arm among the actuator arms 40, and each respective fine actuator may be configured to simultaneously expand one of the two opposing actuator panels and contract the other of the two opposing actuator panels, thereby effectuating actuation of a portion of the suspension assembly distal to the fine actuator.

Fine actuator drivers 24 may comprise any of a number of novel features in combination with other fine actuator driver features, configured to implement functions, techniques, methods, processes, and elements of this disclosure. Fine actuator drivers 24 may differ from prior art actuator drivers in a variety of circuit elements that may moderate or slow the rise or the change in bias current delivered to fine actuators such as milliactuators 50 and/or microactuators 60 and/or other fine actuators during engagement and/or disengagement of the fine actuators, in accordance with various examples of this disclosure. As three particular examples among many potential examples comprised within the scope of the present disclosure, fine actuator drivers 24 may comprise a novel RC filter, a novel constant current source, and/or a novel exponential rise circuit. These examples are shown in the subsequent figures and described below with reference thereto.

Figure 4:
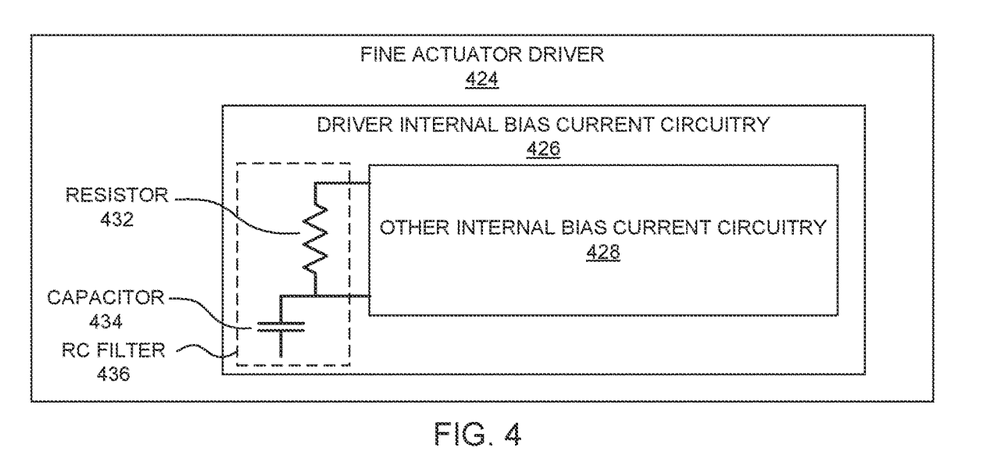
FIGS. 4-6 each illustrates a conceptual block diagram of one or more fine actuator drivers comprising various examples of driver internal bias current circuitry, in accordance with aspects of the present disclosure.

FIG. 4 illustrates a conceptual block diagram 400 of one or more fine actuator drivers 424 comprising driver internal bias current circuitry 426, in accordance with aspects of the present disclosure. In the example of FIG. 4, driver internal bias current circuitry 426 comprises a resistor 432 and a capacitor 434, coupled to other internal bias current circuitry 428, which may be implemented as an operational amplifier (op amp) driver, or in other forms, in various examples. Resistor 432 is coupled in parallel with the other internal bias current circuitry 428, and capacitor 434 is coupled in series with resistor 432. Resistor 432 and capacitor 434 together form a low-pass RC filter 436 on the generating of the bias current of the fine actuator driver 424, which may have the effect of moderating or slowing the generating or outputting of the bias current on engaging a fine actuator, and in particular, causing an asymptotic rise in the generated and outputted bias current, up to the selected final bias current, as is further explained below, in accordance with various examples. An asymptotic rise in the outputted bias current may also be accomplished using a variety of other circuit structures than the illustrative example of FIG. 6, in various other examples of the present disclosure.

Figure 5:
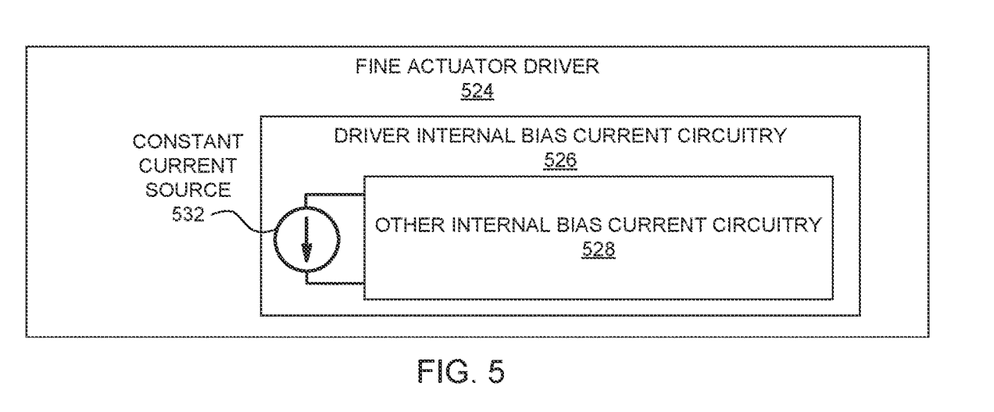

FIG. 5 illustrates a conceptual block diagram 500 of one or more fine actuator drivers 524 comprising driver internal bias current circuitry 526, in accordance with aspects of the present disclosure. In the example of FIG. 5, driver internal bias current circuitry 526 comprises a constant current source 532, coupled to other internal bias current circuitry 528, which may also be implemented as an op amp driver, or in other forms, in various examples. Constant current source 532 may have the effect of moderating or slowing the generating or outputting of the bias current on engaging a fine actuator, and in particular, causing a moderated or slowed linear or straight-line rise (assuming an ideal constant current source) in the generated and outputted bias current, up to the selected final bias current, as is further explained below, in accordance with various examples. A linear or straight-line rise in the outputted bias current may also be accomplished using a variety of other circuit structures than the illustrative example of FIG. 6, in various other examples of the present disclosure.

Figure 6:
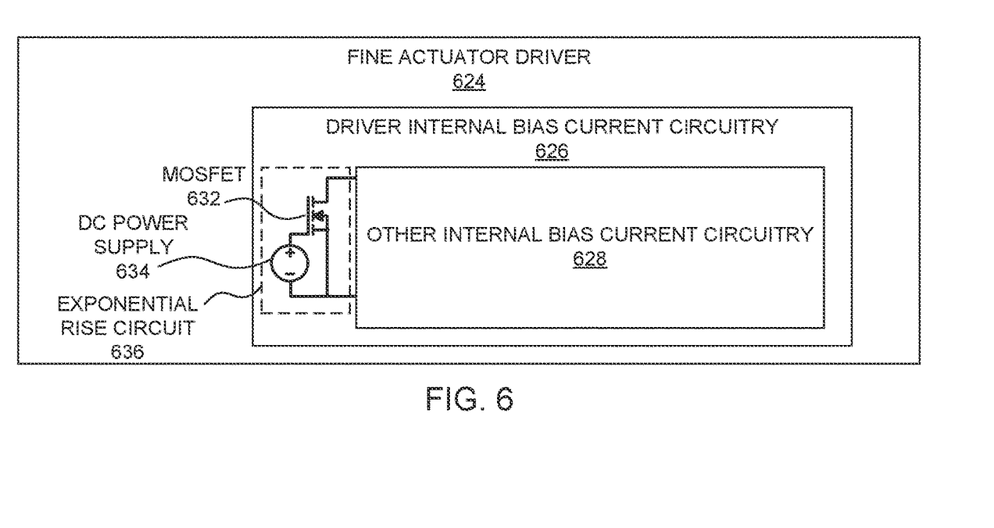

FIG. 6 illustrates a conceptual block diagram 600 of actuator drivers 624 comprising driver internal bias current circuitry 626, in accordance with aspects of the present disclosure. In the example of FIG. 6, driver internal bias current circuitry 626 comprises a metal-oxide semiconductor field-effect transistor (MOSFET) 632 and a DC power supply 634, coupled to other internal bias current circuitry 628. MOSFET 632 is coupled in parallel with the other internal bias current circuitry 628, and DC power supply 634 is coupled in parallel between MOSFET 632 and the other internal bias current circuitry 628, as shown. MOSFET 632 and DC power supply 634 together form an exponential current rise circuit 636, in this example. Exponential current rise circuit 636 may have the effect of moderating or slowing the generating or outputting of the bias current on engaging a fine actuator, and in particular, causing an initially exponential and subsequently logistical or otherwise moderated rise in the generated and outputted fine actuator bias current as is further explained below, in accordance with various examples. The rise in bias current may remain exponential either until reaching the specified final output bias current, or through most or part of the rise toward the specified final output bias current, and then may take a different form. For example, the overall rise in current may take the form of a logistical growth curve, i.e., a Verhulst curve, which is characterized by exponential growth during an initial phase, which then moderates through an inflection point in an intermediate phase, and then finishes out in an asymptotic rise toward the specified final value in its final phase, up to the selected final bias current, in accordance with various examples. An exponential and/or logistical growth rise in the outputted bias current may also be accomplished using a variety of other circuit structures than the illustrative example of FIG. 6, in various other examples of the present disclosure.

In the examples of each of FIGS. 4, 5, and 6, although the bias current is moderated or slowed relative to prior art fine actuator drivers, and takes the form of an asymptotic rise, a gradual linear rise, and a logistic growth rise, respectively, rather than the very fast linear rise typical of prior art fine actuator drivers, the rise in bias current up to the selected final bias current is still fast on the scale of typical operations of a disk drive, such that it is still sufficiently fast for purposes of engaging the one or more fine actuators, in accordance with desired speed performance characteristics. Further, in the examples of each of FIGS. 4, 5, and 6, the rise in fine actuator driver current up to the full, final fine actuator driver current and full engagement of the one or more fine actuators, may be up to many orders of magnitude faster than engaging the one or more fine actuators while the actuator arms are parked on their ramps and then actuating the actuator arm assembly and sliders to their desired positions over the disks. Various other examples of the present disclosure may also implement any type of rise in fine actuator driver current with any type of characteristic or curve over time, in addition to the specific illustrative examples of asymptotic, linear, exponential, and logistical curves described with reference to FIGS. 4-6, and may be selected to program any desired slope control, and/or to suit any of a wide variety of design and/or operating criteria for various implementations of data storage devices of the present disclosure. In other words, the circuitry of a fine actuator driver in accordance with example principles of this disclosure may implement programmable slope control for the biasing current and the biasing voltage that the fine actuator driver applies to the fine actuators. In various examples, the fine actuator driver circuitry may be configured to implement programmable slope control for the biasing voltage in terms of being configured to rate limit a change of the driver voltage over time as applied to the fine actuator, during an activation of the driver current, to within a selected rate limit of change of voltage over time, as discussed herein. A fine actuator driver or other control circuitry may be configured to rate limit the rate of change of the voltage as the voltage goes either to a lower or higher value, or a lower or higher absolute value, in various examples. The fine actuator driver circuitry may also be configured to rate limit the change of voltage by damping oscillations, and by rate limiting changes as the voltage either returns to stabilization at zero volts or another starting voltage, or as the voltage is changed from zero volts or another starting voltage to a non-zero or other different target engagement voltage or bias voltage, such as −6.5 volts in one example, or any other voltage in various examples.

Figure 7:
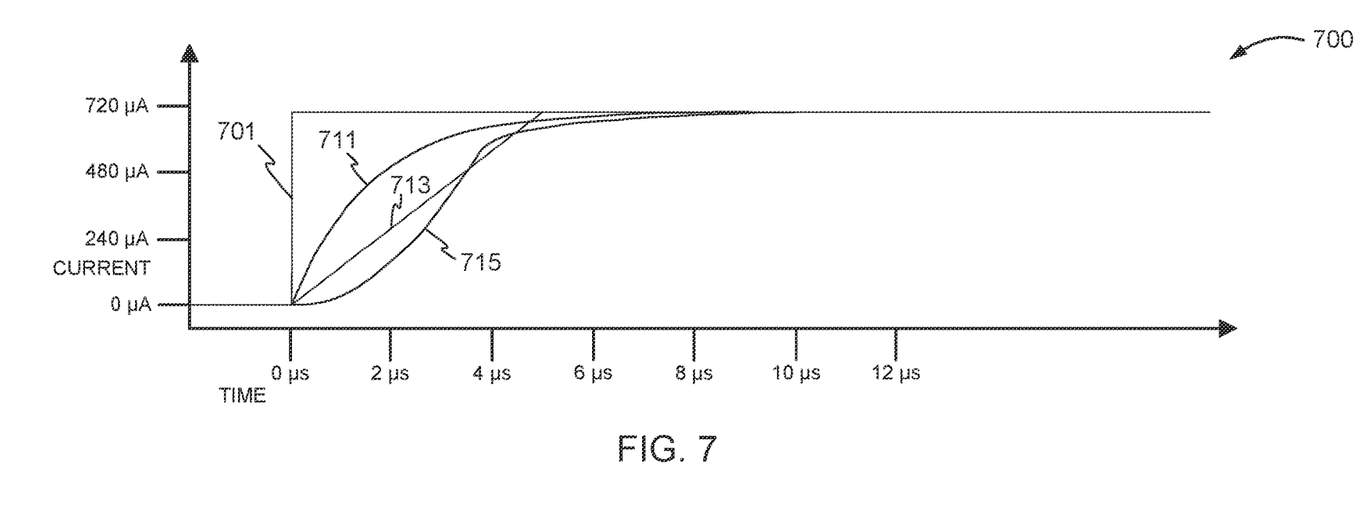
FIG. 7 shows a graph comparing profile simulations of the startup of simulated fine actuator bias current over time with different example fine actuator drivers of this disclosure with a prior art baseline, in accordance with aspects of the present disclosure.

FIG. 7 shows a graph 700 comparing profile simulations of the startup of simulated fine actuator bias current over time with different example fine actuator drivers of this disclosure with a prior art baseline, in accordance with aspects of the present disclosure. In prior art baseline graph 701 of fine actuator bias current over time, the fine actuator bias current jumps up from approximately 0 microamps to a final bias current of approximately 700 microamps, in approximately a straight line, within a very small fraction of a microsecond, e.g., within less than ten nanoseconds, and quickly enough to appear almost instantaneous on the scale of FIG. 7. This prior art jump in startup bias current delivered to prior art fine actuators typically results in rapid and insufficiently controlled motions of the prior art fine actuators, such that prior art fine actuators can only safely be engaged with their drivers while the prior art fine actuators are parked on their ramps, rather than being on disk. In contrast, graphs 711, 713, 715 show fine actuator bias current over time for three specific example fine actuator drivers of the present disclosure (e.g., fine actuator drivers 24, 324, 424, 524, 624)—all of which demonstrate much more gradual and easily controllable rise in bias current delivered to the fine actuators (e.g. milliactuators 50, 350, microactuators 60, 360) over time during initial engagement of the fine actuators with the fine actuator drivers, each of which may enable safe, soft activation of the fine actuators on disk.

In particular, graph 711 shows fine actuator bias current over time for fine actuator driver 424 of FIG. 4, comprising RC filter 436. Graph 711 shows an example gentle asymptotic rise of the bias current from 0 to approximately 700 microamps over a period of about ten microseconds, for fine actuator driver 424 of FIG. 4 comprising RC filter 436. Graph 713 shows fine actuator bias current over time for fine actuator driver 524 of FIG. 5, comprising constant current source 532. Graph 713 shows an example gentle linear rise of the bias current from 0 to approximately 700 microamps over a period of about five microseconds, for fine actuator driver 524 of FIG. 5 comprising constant current source 532. Graph 715 shows fine actuator bias current over time for fine actuator driver 624 of FIG. 6, comprising exponential rise circuit 636. Graph 715 shows an example gentle exponential rise of the bias current from 0 to approximately 600 microamps over a period of about four microseconds, before inflecting into a logistical growth curve or Verhulst curve and asymptotically approaching approximately another 100 microamps over approximately the subsequent 6 microseconds, thereby reaching approximately 700 microamps after approximately ten microseconds, for fine actuator driver 624 of FIG. 6 comprising exponential rise circuit 636.

Each of example fine actuator drivers 424, 524, 624 of FIGS. 4-6 of this disclosure thus provide various characteristics and advantages in delivering a gentle, easily controllable initial bias current to fine actuators of the present disclosure (e.g., milliactuators 50, 350; microactuators 60, 360) when initially engaging the fine actuators. Fine actuator drivers of the present disclosure may also be implemented in any of a wide variety of other circuits, devices, and means, including other implementations of filters or exponential rise circuits beyond those depicted in FIGS. 4 and 6, any combination of the circuit elements shown in FIGS. 4-6, and any of a wide variety of additional implementations. Additional implementations of fine actuator drivers of this disclosure may deliver any of a wide variety of profiles of initial bias current to fine actuators of this disclosure.

Different specific implementations and current profiles may be selected for different purposes, in different example implementations of the present disclosure. For example, different specific implementations and current profiles may be selected to provide options for programmability, tunability, and optimization in various specific implementations of the initial driver startup bias current of the fine actuator driver. Having a wide variety of different driver bias current startup profiles (i.e., engagement or activation profiles) and shutdown profiles (i.e., disengagement or deactivation profiles) available may enable and facilitate fine-tuning and optimizing characteristics of the driver startup bias current, including characteristics such as overshoot magnitude, turn-on time, and turn-off time. In some examples, having a wide variety of different driver bias current startup profiles and shutdown profiles available as selectable options, at various stages of design engineering, test engineering, manufacturing, operating, and/or other phases of research, development, manufacturing, and operating, of different implementations of the present disclosure, may help optimize for the fastest turn-on time and turn-off time that will also have either no overshoot, or sufficiently little overshoot magnitude to stay constrained to within assured safe operating parameters for the fine actuator, relative to specified operating criteria for a particular product or other implementation in accordance with the present disclosure.

Within safe operating constraints, generally, the faster the turn-on time and turn-off time for the fine actuator, the better; and the faster the turn-on time for the fine actuators, within safe operating constraints, the faster the "time to ready" for the fine actuators and thus for the actuator arm assemblies and the read/write heads, and the faster the response time for write and read of control features and data. Thus, some example implementations may be optimized for the activation time of the one or more fine actuator drivers to be, in at least a simplified conceptual sense, as fast as possible within constraints or margins that still ensure safe activation of the fine actuators while the actuator arms are suspended over the corresponding disks, or within a reasonable margin of being as fast as possible within safe operating constraints. The determination of how to balance multiple competing criteria in implementing driver engagement and driver disengagement, such as balancing engagement speed with desired margins of safety, may be performed subject to design, test, and manufacturing engineering criteria, in light of the principles of this disclosure in combination with the understanding of persons skilled in the art.

In addition, the driver internal bias current circuitry (e.g., driver internal bias current circuitry 426, 526, 626 of FIGS. 4-6) may be affected by various parasitic components in surrounding circuitry of the fine actuator driver in which it is comprised (e.g., fine actuator driver 424, 524, 624 of FIGS. 4-6) or other surrounding circuitry. Additionally, the entire physical control and data communication channels between the fine actuator drivers and the fine actuators may involve long communication lines that may likely be affected by various proximate circuit elements, devices, and other components that may act as parasitics on the complete fine actuator system, which may be considered as comprising the fine actuator drivers, the fine actuators, and the channels between them. In many cases, it may be highly challenging to accurately characterize the complete set of parasitic effects on the complete fine actuator system during design engineering, and a prototype or test article may reveal differences in the physical silicon from expected properties in the design of the silicon; and it may be left to test engineering and/or an early stage of manufacturing to finish making an accurate determination of the parasitic effects on the fine actuator system.

In some cases, such characterization may reveal that the parasitic effects on the fine actuator system are dominated by or primarily dependent on a particular parasitic effect, such as capacitive dependent, inductive dependent, or resistance dependent parasitism. In other examples, the parasitism may be substantially a mix of two or all three of the above. Having a variety of driver startup bias current profile options available may enable different options for responding to whatever resulting characterization of parasitic effects is revealed in prototypes or test articles of a particular implementation of the present disclosure, by fine-tuning or calibrating the finalized manufacturing design of a particular product or implementation of the present disclosure. In various examples of this disclosure, the driver internal bias current circuitry and/or other elements of the fine actuator drivers may be configured, such as by components or other means that implement programmable slope control of current and/or voltage, to compensate for any combination or variation of resistance-based parasitism, inductance-based parasitism, and/or capacitance-based parasitism (collectively, RLC parasitism). For example, in various examples of this disclosure, the driver internal bias current circuitry, and/or other elements of the fine actuator drivers, may comprise circuit elements, such as one or more resistors, capacitors, inductors, or other types of circuit elements, that are trimmable or ablatable by design, and with well-characterized relations in how such trimming or ablation of such elements may implement a desired modification or fine-tuning or calibrating in the physical properties of a finalized fine actuator driver and a finalized data storage device product implementing an example of the present disclosure, after such trimming or ablation of such modifiable circuit elements are carried out. In some examples, prototype or test article disk drives may be made in accordance with a new design in accordance with this disclosure, and subject to test engineering to determine how parasitic effects in silicon affect the operation of the fine actuator driver, and then values for certain trimmable-by-design circuit elements of the driver internal bias current circuitry (e.g., values for resistance and capacitance of RC filter 436) may be selected and assigned to a particular product line in accordance with this disclosure, and then those trimmable-by-design circuit elements may be trimmed to meet those values in the finalized, large-scale manufacturing of the product line.

Such trimmable-by-design circuit elements may also be trimmable in a late manufacturing phase physical fine tuning manufacturing process, to make late-manufacturing-stage or final-manufacturing-stage small modifications to help address or correct for manufacturing variability and different parasitic elements that may show up as fine deviations from design in silicon in an intermediate manufacturing phase. In other examples, an analogous process may extend beyond finalizing the design, to performing trimming or ablation of modifiable-by-design circuit elements as late-stage physical error correction manufacturing steps in the manufacturing of products in accordance with this disclosure, to perform physical error correction that may vary according to physical error correction goals determined in a physical error characterization stage in an intermediate or late stage of manufacturing, to make whatever physical fine-tuning or calibrating corrections might be needed from one product batch to another or from one individual product to another within the same product design and to meet the same product design specifications within designated or nominal tolerances.

As one particular example of trimmable-by-design circuit elements for physical fine-tuning, fine actuator driver 424 in the example of FIG. 4 may be designed to be manufactured with RC filter 436 exposed to one or more further, supplemental manufacturing fine-tuning steps, and either or both of resistor 432 and/or capacitor 434 may be exposed to further modification after the initial manufacture of fine actuator driver 424. The manufacturing process system may then perform measurements or characterization of fine actuator driver 424, including of RC filter 436, and may then perform trimming or ablation of either or both of resistor 432 and/or capacitor 434 to fine-tune the resistance or other properties of resistor 432 and/or the capacitance or other properties of capacitor 434, to get these values, or other properties affected by these values, such as a driver current activation curve of change in driver current over time during engagement and disengagement of the driver, to within specified precision tolerances of their design specifications. Such measurement of properties and then trimming of trimmable-by-design circuit elements may be implemented in a single round, in a pre-set number of multiple rounds, or in an iterative number of rounds until specified precision tolerances are achieved, in various examples of this disclosure.

As particular examples of physical fine-tuning to address or counteract particular dominant parasitic modes, in some examples, a design engineering process or a manufacturing process in accordance with this disclosure may comprise responding to determining that a fine actuator driver has induction-dominant parasitism by selecting an exponential rise circuit 636 as in FIG. 6 to be comprised and implemented in the fine actuator driver, which may effectively counteract the inductive-dominant parasitism, in various examples of this disclosure. A design engineering process or a manufacturing process in examples of this disclosure may also comprise responding to determining that the parasitism of the fine actuator system in a disk drive design, batch, or individual product in accordance with an implementation of this disclosure is capacitance-dominant, by selecting a constant current source 532 to incorporate in the fine actuator driver, as in example fine actuator driver 524 of FIG. 5, which may counteract the capacitance-dominant parasitism, in various examples of this disclosure. A design engineering process or a manufacturing process in examples of this disclosure may also comprise responding to determining that the parasitism of the fine actuator system in a disk drive design, batch, or individual product in accordance with an implementation of this disclosure is resistance-dominant, or RC-dominant (i.e., dominated by parasitism characterized by a combination of resistance and capacitance), by selecting an RC filter 436 to incorporate in the fine actuator driver, as in example fine actuator driver 424 of FIG. 4, which may counteract the resistance-dominant or RC-dominant parasitism, in various examples of this disclosure. Other examples of this disclosure may comprise selecting other circuit elements or combinations of circuit elements to address or counteract other modes or patterns of parasitism in a fine actuator driver system, including more complex circuits to address or counteract more complex patterns of parasitism.

As noted, such selection of one or more circuit elements to address or counteract a dominant parasitism mode can be made or performed either during intermediate or late design engineering, or during manufacturing. If implemented during manufacturing, in some examples, a fine actuator driver may be designed, implemented, and manufactured with circuit elements of all three of the examples of FIGS. 4-6 within the driver internal bias current circuitry of a fine actuator driver, and then the manufacturing process may select the circuit elements of one of the examples of FIGS. 4-6 to designate as the effective or implemented circuit to address or counteract the dominant parasitic mode determined for that particular product batch or individual product. This may be combined with a fine-tuning process, such as a trimmable-by-design process as described above, in various examples of this disclosure.

Figure 8A:
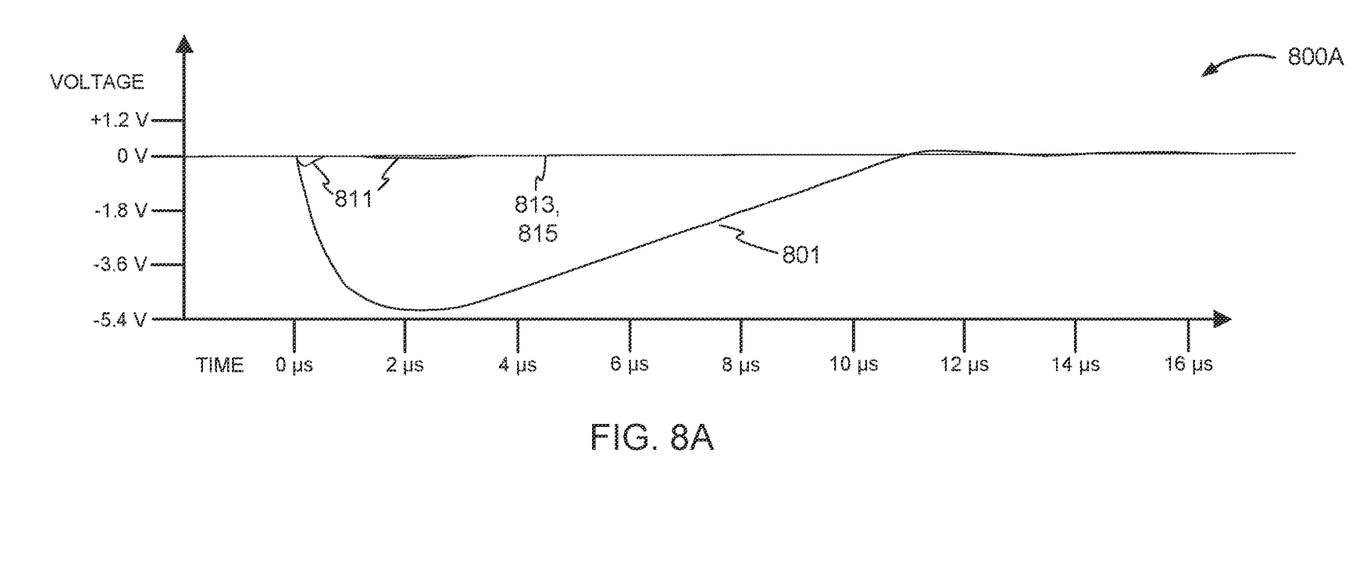
FIGS. 8A and 8B show zoomed out and zoomed in versions, respectively, of a graph of simulated changes in voltage over time of the output of example milliactuator drivers during activation, in three different example profiles of the present disclosure corresponding to milliactuator implementations of the three example fine actuator driver circuits and graphs of current over time as in FIGS. 4-7, compared with a typical prior art baseline, in accordance with aspects of the present disclosure.
Figure 8B:
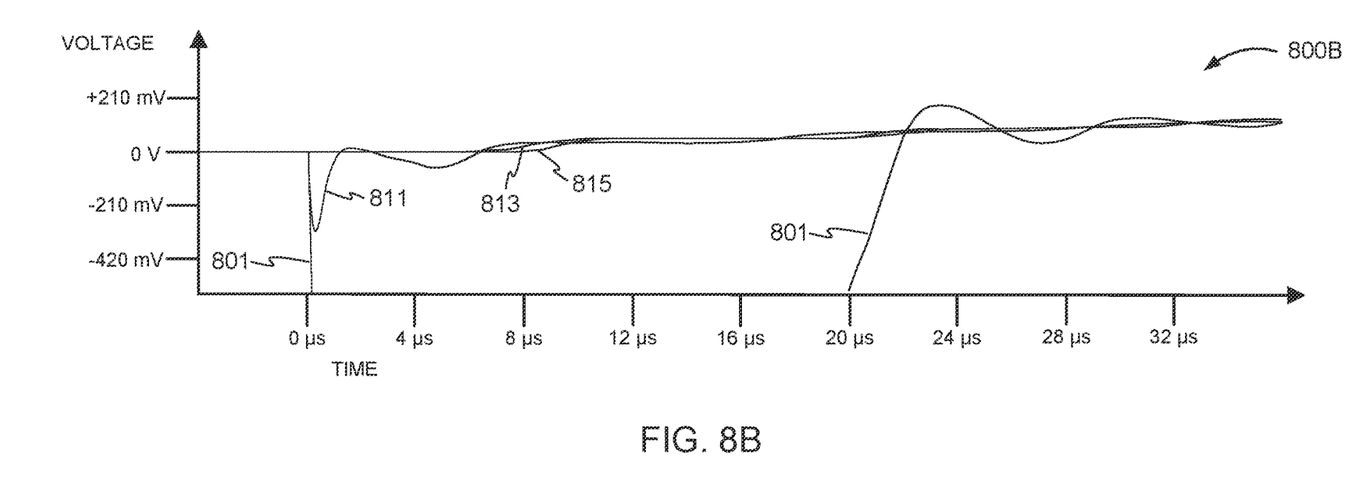

FIG. 8A shows a zoomed out graph 800A of simulated changes in voltage over time of the output of example milliactuator drivers during activation, in three different example profiles of the present disclosure corresponding to milliactuator implementations of the three example fine actuator driver circuits and graphs of current over time as in FIGS. 4-7, compared with a typical prior art baseline, in accordance with aspects of the present disclosure. FIG. 8B shows a zoomed in graph 800B of the same changes in voltage over time of the output of the same three example milliactuator drivers during activation, compared with the typical prior art baseline, on the same time scale (on the x axis) as in FIG. 8A but with the scale of the voltage (on the y axis) magnified by about ten times, relative to the scale of FIG. 8A, in accordance with aspects of the present disclosure. The graphs of voltage over time correspond with slew rates implemented by the milliactuators. FIGS. 8A and 8B specifically apply to certain example milliactuator drivers of the present disclosure because in some examples of the present disclosure, milliactuator drivers have a zero voltage bias during operation, while microactuators have a non-zero (e.g., negative) voltage bias during operation, as explained further below. In other examples, milliactuators and/or microactuators of this disclosure may both have zero voltage bias, both have non-zero voltage bias, or have any other combination or arrangement of bias voltage during operation.

As FIG. 8A shows, in the prior art baseline, in its response to activation, a milliactuator driver outputs a driver output having a voltage 801 that steeply drops from zero volts (0 V) to about −5 V within approximately 2 microseconds, before leveling out and then roughly linearly, and more slowly, rising back up in voltage, returning to close to 0 V approximately 11 microseconds after the start of activation, and then continuing to exhibit a decaying oscillation about a value slowly rising tens of millivolts above 0 V for at least several more microseconds, as can be seen in FIG. 8B. In contrast, the milliactuator driver outputs of the three examples of this disclosure as discussed above have voltages 811, 813, 815 that have very little to negligible voltage overshoot, and deviate very much less from zero volts.

In particular, voltage over time 811 is of the driver output of a milliactuator implementation of fine actuator driver 424 of this disclosure, comprising RC filter 436 as in FIG. 4. Voltage over time 811 shows an overshoot down to about negative 300 millivolts after start of activation, and then an almost equally swift return to approximately zero volts, within a fraction of one microsecond, before settling into very minorly oscillating around a value rising tens of millivolts over the subsequent tens of microseconds. Voltage over time 813 is of the driver output of a milliactuator implementation of fine actuator driver 524 of this disclosure, comprising constant current source 532 as in FIG. 5. Voltage over time 813 exhibits no detectable overshoot after the start of activation. Voltage over time 813 then shows a gentle rise of a few tens of millivolts around 2 microseconds after the start of activation, then settles into barely detectable undulations in rising tens of millivolts over the subsequent tens of microseconds. Voltage over time 815 is of the driver output of a milliactuator implementation of fine actuator driver 624 of this disclosure, comprising exponential rise circuit 636 as in FIG. 6. Voltage over time 815 also exhibits no detectable overshoot after the start of activation. Voltage over time 813 then also shows a gentle rise of a few tens of millivolts around 2 microseconds after the start of activation, then settles into no detectable deviation from smoothly rising tens of millivolts over the subsequent tens of microseconds.

Figure 9:
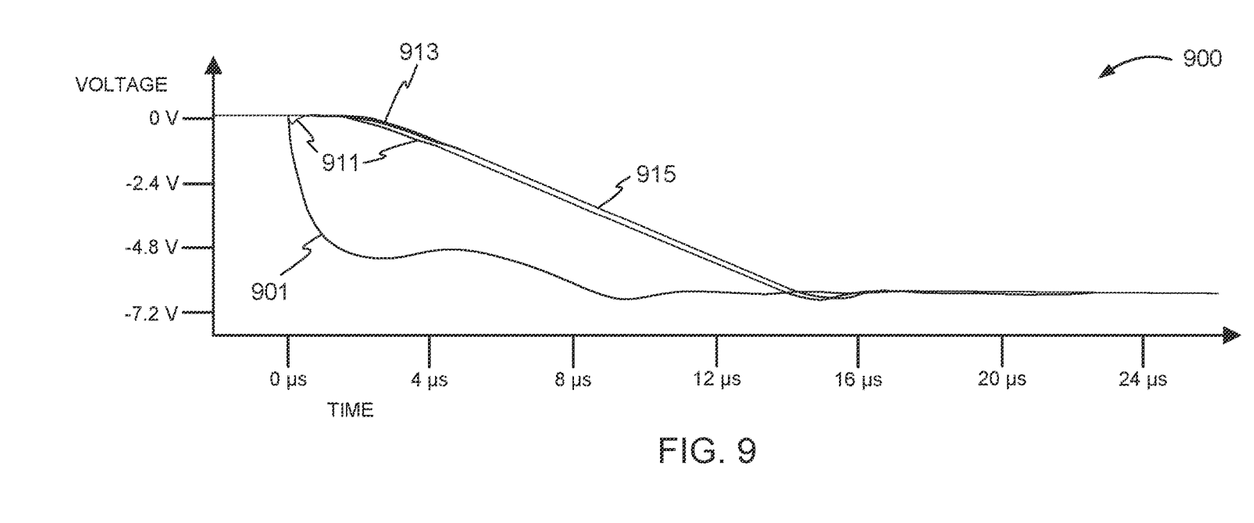
FIG. 9 shows a graph of simulated changes in voltage over time of the output of example microactuator drivers during activation, in microactuator implementations of the same three different example profiles of the present disclosure corresponding to the three example fine actuator driver circuits and graphs of current over time as in FIGS. 4-6, compared with a typical prior art baseline, in accordance with aspects of the present disclosure.

FIG. 9 shows a graph 900 of simulated changes in voltage over time of the output of example microactuator drivers during activation, in microactuator implementations of the same three different example profiles of the present disclosure corresponding to the three example fine actuator driver circuits and graphs of current over time as in FIGS. 4-6, compared with a typical prior art baseline, in accordance with aspects of the present disclosure. The graphs of voltage over time correspond with slew rates implemented by the microactuators. In the prior art baseline graph of voltage over time 901, in response to the start of activation, the microactuator driver signal begins with a precipitous drop in voltage from zero to approximately negative five (−5) volts within approximately 1 microsecond, before oscillating unevenly toward the target bias voltage of negative six point five (−6.5) volts over approximately the subsequent 15 microseconds. In contrast, the graphs of voltage over time 911, 913, 915 for microactuator drivers of the present disclosure all show a well-controlled and orderly descent from the initial 0 voltage condition to the target −6.5 V bias voltage, with highly well-constrained or negligible overshoot.

In particular, graph of voltage over time 911 is of the driver output of a microactuator implementation of fine actuator driver 424 of this disclosure, comprising RC filter 436 as in FIG. 4. Graph of voltage over time 911 shows a very small, constrained overshoot down to about negative 300 millivolts (compared with about negative five volts in the prior art baseline) after start of activation, and then an almost equally swift return to approximately zero volts, within a fraction of one microsecond, before settling into a very even, linear, gentle descent from approximately zero volts to approximately the target bias voltage of −6.5 volts, over about 17 microseconds. Graph of voltage over time 913 is of the driver output of a microactuator implementation of fine actuator driver 524 of this disclosure, comprising constant current source 532 as in FIG. 5, and graph of voltage over time 915 is of the driver output of a microactuator implementation of fine actuator driver 624 of this disclosure, comprising exponential rise circuit 636 as in FIG. 6. Graphs of voltage over time 913, 915 are nearly indistinguishable from each other in exhibiting no feasibly detectable overshoot (on the scale of graph 900 as shown in FIG. 9) after the start of activation, and then also settling into a very even, linear, gentle descent from approximately zero volts to approximately the target bias voltage of −6.5 volts, over about 17 microseconds. Graphs of voltage over time 911, 913, and 915 for all three of these example implementations of the present disclosure only show a very slight and swiftly decaying oscillation about the target bias voltage of −6.5 volts once they first reach it, before settling steadily into the target value. Thus, the driver internal bias current circuitry and/or other elements of the fine actuator drivers may be configured, such as by components or other means that implement programmable slope control of current and/or voltage, to compensate for any combination or variation of resistance-based parasitism, inductance-based parasitism, and/or capacitance-based parasitism (collectively, RLC parasitism), in various examples of this disclosure. In various illustrative examples, the driver internal bias current circuitry may be comprised in or comprise a PLSI circuit that comprises a fine actuator driver, and the PLSI circuit may comprise a current slew rate controlled current branch and a voltage slew rate controlled voltage node. The current slew rate controlled current branch and the voltage slew rate controlled voltage node may intersect each other. The current slew rate controlled current branch and the voltage slew rate controlled voltage node may output, deliver, and/or apply current and/or voltage to a fine actuator, such as milliactuator 50A and/or microactuator 60A, across control signal channels (e.g., milliactuator control channel 359, microactuator control channel 369) that are routed along a path proximate to potentially uncontrolled RLC parasitic elements (e.g., in the PLSI, the printed circuit board assembly (PCBA), in the actuator arm assembly), which may be infeasible or impossible to keep the control signal channels fully shielded from, in such a way as to ensure a reduced or minimized perturbation in voltage at the fine actuator as the driver current is applied to the fine actuator, as shown in FIG. 9.

In the particular example of FIG. 9, the microactuators may be operated with a specified target bias voltage of −6.5 volts for the purpose of electrically enforcing positional persistence of the atoms of silver in a layer of silver on one side of a respective microactuator panel of the microactuators and soldered together to the adjacent layer of the microactuator panel, and preventing the silver atoms from migrating through their adjacent layers in the microactuator panels, in this example. In other examples, any of a variety of other materials may be used in the microactuator panels, and any non-zero bias voltage or a zero bias voltage may be used. In other examples, milliactuator implementations of this disclosure may also operate with a non-zero bias voltage, as opposed to the milliactuator examples with zero operating bias voltage as discussed above, and analogous curves of voltage over time and analogous principles as discussed with reference to FIG. 9 may also apply to milliactuator driver implementations of this disclosure.

FIGS. 7, 8A, 8B, and 9 thus show in a variety of ways that a variety of example implementations of fine actuator drivers of the present disclosure may activate their corresponding fine actuators very rapidly, within microseconds, yet with highly constrained or negligible overshoot, and with very even, orderly output and delivery of the driver current through activation and deactivation. FIGS. 7, 8A, 8B, and 9 thus show that a variety of example implementations of fine actuator drivers of the present disclosure may activate their corresponding fine actuators rapidly within any desired level of safety margins, and may enable disk drives in which milliactuators and microactuators may safely and reliably be activated while the actuator arms are over their corresponding disk surfaces. FIGS. 7, 8A, 8B, and 9 are merely illustrative examples of an arbitrarily broad and potentially unlimited variety of programmable slope control of the biasing current and the biasing voltage that a fine actuator driver in accordance with this disclosure may apply to the fine actuators. A variety of example implementations of fine actuator drivers of the present disclosure may thus enable data storage devices that may optimize actuator slew rates and achieve effectively maximum allowable actuator slew rates without exceeding slew rate safety limits that could cause z-bouncing and head-disk interaction. A variety of example implementations of fine actuator drivers of the present disclosure may thus enable data storage devices with faster operating speeds and faster data input/output rates than otherwise comparable data storage devices of the prior art, while also maintaining similarly high reliability over time.

Various examples may also enable further advantages such as novel power saving modes, in which the control circuitry may perform a soft disengage of the milliactuators and/or microactuators on disk when they are not in use or not needed, such as during a seek operation or during lulls in demand for write and/or read operations, and then rapidly perform a soft reactivation of the milliactuators and/or microactuators on disk shortly or immediately before needing to operate them again. That is, the control circuitry may be configured to disengage the milliactuators and/or microactuators while the milliactuators and/or microactuators are positioned over the disk surfaces when they are not in use, and then to reactivate the milliactuators and/or microactuators while the milliactuators and/or microactuators are positioned over the disk surfaces, thereby implementing power savings at the same time as faster operating and data input-output speeds, in various examples.

Any suitable control circuitry may be employed to implement the flow diagrams in the above examples, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In one example, the read channel and data storage controller are implemented as separate integrated circuits, and in another example they are fabricated into a single integrated circuit or system on a chip (SoC). In addition, the control circuitry may include a suitable preamp circuit implemented as a separate integrated circuit, integrated into the read channel or data storage controller circuit, or integrated into an SoC.

In one example, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory device, component, or system external to the microprocessor, or integrated with the microprocessor in an SoC. In another example, the instructions are stored on the disk and read into a volatile semiconductor memory when the disk drive is powered on. In yet another example, the control circuitry comprises suitable logic circuitry, such as state machine circuitry. In some examples, at least some of the flow diagram blocks may be implemented using analog circuitry (e.g., analog comparators, timers, etc.), and in other examples at least some of the blocks may be implemented using digital circuitry or a combination of analog and digital circuitry.

In various examples, one or more processing devices may comprise or constitute the control circuitry as described herein, and/or may perform one or more of the functions of control circuitry as described herein. In various examples, the control circuitry, or other one or more processing devices performing one or more of the functions of control circuitry as described herein, may be abstracted away from being physically proximate to the disks and disk surfaces. The control circuitry, or other one or more processing devices performing one or more of the functions of control circuitry as described herein, may be part of or proximate to a rack of or a unitary product comprising multiple data storage devices, or may be part of or proximate to one or more physical or virtual servers, or may be part of or proximate to one or more local area networks or one or more storage area networks, or may be part of or proximate to a data center, or may be hosted in one or more cloud services, in various examples.

In various examples, a disk drive may include a magnetic disk drive, an optical disk drive, a hybrid disk drive, or other types of disk drive. In addition, some examples may include electronic devices such as computing devices, data server devices, media content storage devices, or other devices, components, or systems that may comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences. For example, described tasks or events may be performed in an order other than that specifically disclosed, or multiple may be combined in a single block or state. The example tasks or events may be performed in serial, in parallel, or in another manner. Tasks or events may be added to or removed from the disclosed examples. The example systems and components described herein may be configured differently than described. For example, elements may be added to, removed from, or rearranged compared to the disclosed examples.

While certain example embodiments are described herein, these embodiments are presented by way of example only, and do not limit the scope of the inventions disclosed herein. Thus, nothing in the foregoing description implies that any particular feature, characteristic, step, module, or block is necessary or indispensable. The novel methods and systems described herein may be embodied in a variety of other forms. Various omissions, substitutions and changes in the form of the methods and systems described herein may be made without departing from the spirit and scope of the present disclosure.

Method 80 and other methods of this disclosure may include other steps or variations in various other embodiments. Some or all of any of method 80 may be performed by or embodied in hardware, and/or performed or executed by a controller, a CPU, an FPGA, a SoC, a measurement and control multi-processor system on chip (MPSoC), which may include both a CPU and an FPGA, and other elements together in one integrated SoC, or other processing device or computing device processing executable instructions, in controlling other associated hardware, devices, systems, or products in executing, implementing, or embodying various subject matter of the method.

Soft on-disk fine actuator activation and deactivation data storage systems, devices, and methods are thus shown and described herein, in various foundational aspects and in various selected illustrative applications, architectures, techniques, and methods for soft on-disk fine actuator activation and deactivation. Persons skilled in the relevant fields of art will be well-equipped by this disclosure with an understanding and an informed reduction to practice of a wide panoply of further applications, architectures, techniques, and methods for soft on-disk fine actuator activation and deactivation encompassed by the present disclosure and by the claims set forth below.

As used herein, the recitation of "at least one of A, B and C" is intended to mean "either A, B, C or any combination of A, B and C." The descriptions of the disclosed examples are provided to enable any person skilled in the relevant fields of art to understand how to make or use the subject matter of the present disclosure. Various modifications to these embodiments will be readily apparent to those skilled in the art based on the present disclosure, and the generic principles defined herein may be applied to other examples without departing from the spirit or scope of the disclosure. Thus, the present disclosure is not limited to the embodiments shown herein but is to be accorded the widest scope consistent with the principles and novel features disclosed herein.

The present disclosure and many of its attendant advantages will be understood by the foregoing description, and various changes may be made in the form, construction, and arrangement of the components without departing from the disclosed subject matter or without sacrificing all of its material advantages. The form described is merely explanatory, and the following claims encompass and include a wide range of embodiments, including a wide range of examples encompassing any such changes in the form, construction, and arrangement of the components as described herein.

While the present disclosure has been described with reference to various examples, it will be understood that these examples are illustrative and that the scope of the disclosure is not limited to them. All subject matter described herein are presented in the form of illustrative, non-limiting examples, and not as exclusive implementations, whether or not they are explicitly called out as examples as described. Many variations, modifications, and additions are possible within the scope of the examples of the disclosure. More generally, examples in accordance with the present disclosure have been described in the context of particular implementations. Functionality may be separated or combined in blocks differently in various examples of the disclosure or described with different terminology, without departing from the spirit and scope of the present disclosure and the following claims. These and other variations, modifications, additions, and improvements may fall within the scope of the disclosure as defined in the claims that follow.

What is claimed is:

1. A data storage device, comprising:
   one or more disks;
   an actuator arm assembly comprising one or more actuator arms, and configured to position the one or more actuator arms over disk surfaces of the one or more disks;

one or more fine actuators, disposed on the one or more actuator arms; and one or more processing devices, configured to:
output a driver current to the one or more fine actuators; and rate limit a rise of the driver current over time, during an activation of the driver current, to within a selected rate limit of current rise over time.

2. The data storage device of claim 1, wherein the selected rate limit of current rise over time is defined in terms of operating constraints of the one or more fine actuators that prevent one or more heads from physically contacting the disk surfaces during the activation of the driver current while the actuator arms are positioned over the disk surfaces.

3. The data storage device of claim 1, wherein the one or more processing devices are further configured to rate limit the rise of the driver current over time during the activation of the driver current to an optimized rate of current rise over time, determined via a process to optimize for increasing the driver current within a feasible margin of being as quickly as possible within safe operating constraints of the fine actuators during the activation of the driver current while the actuator arms are positioned over the disk surfaces.

4. The data storage device of claim 1, wherein the one or more processing devices are further configured to activate the driver current output to the one or more fine actuators while the actuator arm assembly has the one or more actuator arms positioned over the one or more disks.

5. The data storage device of claim 1, wherein the selected rate limit of current rise over time is selected to ensure safe operation of the one or more fine actuators while the one or more fine actuators are positioned over the one or more disks.

6. The data storage device of claim 1, wherein the one or more processing devices are further configured to rate limit, during a deactivation of the driver current, a fall of the driver current over time to within a selected limit of current fall over time.

7. The data storage device of claim 1, wherein the one or more fine actuators comprise one or more milliactuators, wherein each respective milliactuator is disposed at a respective proximal end of a respective suspension assembly disposed on a respective actuator arm of the one or more actuator arms.

8. The data storage device of claim 1, wherein the one or more fine actuators comprise one or more microactuators, wherein each respective microactuator is disposed at a respective distal end of a respective suspension assembly disposed on a respective actuator arm of the one or more actuator arms.

9. The data storage device of claim 1, wherein each of the actuator arms comprises a milliactuator and a microactuator, wherein each respective milliactuator is disposed at a respective proximal end of a respective suspension assembly disposed on a respective actuator arm of the one or more actuator arms, and wherein each respective microactuator is disposed at a respective distal end of a respective suspension assembly disposed on a respective actuator arm of the one or more actuator arms.

10. The data storage device of claim 1, wherein each respective fine actuator comprises two opposing actuator panels, disposed on opposing sides of a longitudinal axis of a respective suspension assembly disposed at a distal end of a respective actuator arm among the one or more actuator arms, and wherein each respective fine actuator is configured to simultaneously expand one of the two opposing actuator panels and contract the other of the two opposing actuator panels, thereby effectuating actuation of a portion of the suspension assembly distal to the fine actuator.

11. The data storage device of claim 1, wherein the one or more processing devices comprise a resistor and a capacitor, coupled to additional internal bias current circuitry.

12. The data storage device of claim 1, wherein the one or more processing devices comprise a constant current source, coupled to additional internal bias current circuitry.

13. The data storage device of claim 1, wherein the one or more processing devices comprise an exponential current rise circuit, coupled to additional internal bias current circuitry.

14. The data storage device of claim 1, wherein the one or more processing devices are further configured to rate limit a change of a driver voltage over time during the activation of the driver current to within a selected rate limit of change of voltage over time.

15. The data storage device of claim 1, wherein the one or more processing devices are further configured to disengage the one or more fine actuators while the one or more actuator arms are positioned over the disk surfaces when they are not in use, and then to reactivate the one or more fine actuators while the one or more actuator arms are positioned over the disk surfaces.

16. A method comprising:
outputting, by one or more processing devices, a driver current to one or more fine actuators disposed on one or more actuator arms of a data storage device; and rate limiting, by the one or more processing devices, a rise of the driver current over time, during an activation of the driver current, to within a selected rate limit of current rise over time.

17. The method of claim 16, wherein the selected rate limit of current rise over time is defined in terms of operating constraints of the one or more fine actuators that prevent one or more heads from physically contacting disk surfaces during the activation of the driver current while the one or more actuator arms are positioned over disk surfaces comprised in the data storage device.

18. The method of claim 16, further comprising maintaining the rise of the driver current over time during the activation of the driver current at a substantially optimized rate of current rise over time, determined via a process to optimize for increasing the driver current within a feasible margin of being as quickly as possible within safe operating constraints of the one or more fine actuators during the activation of the driver current while the one or more actuator arms are positioned over disk surfaces comprised in the data storage device.

19. One or more processing devices comprising:
means for outputting a driver current to one or more fine actuators disposed on one or more actuator arms of a data storage device; and means for rate limiting a rise of the driver current over time, as applied to the one or more fine actuators, during an activation of the driver current, to within a selected rate limit of current rise over time.

20. The one or more processing devices of claim 19, wherein the selected rate limit of current rise over time is defined in terms of operating constraints of the one or more fine actuators that prevent one or more heads from physically contacting disk surfaces during the activation of the driver current while the one or more actuator arms are positioned over disk surfaces comprised in the data storage device.

* * * * *